US012764561B2

(12) United States Patent
Abraha et al.

(10) Patent No.: US 12,764,561 B2
(45) Date of Patent: Oct. 13, 2026

(54) BEAMFORMING COVERAGE OPTIMIZATION IN A RADIO ACCESS NETWORK IN A WIRELESS COMMUNICATIONS SYSTEM (WCS)

(71) Applicant: ANI Acquisition Sub, LLC, Boca Raton, FL (US)

(72) Inventors: Solomon Tesfay Abraha, Corning, NY (US); Viacheslav Viacheslavovich Ivanov, Espoo (FI); Anthony Ng'oma, Horseheads, NY (US); David Robert Peters, Painted Post, NY (US)

(73) Assignee: ANI Acquisition Sub, LLC, Boca Raton, FL (US)

( * ) Notice: Subject to any disclaimer, the term of this patent is extended or adjusted under 35 U.S.C. 154(b) by 284 days.

(21) Appl. No.: 18/384,487

(22) Filed: Oct. 27, 2023

(65) Prior Publication Data

US 2025/0142355 A1 May 1, 2025

(51) Int. Cl.
*H04W 16/28* (2009.01)

(52) U.S. Cl.
CPC .................................. *H04W 16/28* (2013.01)

(58) Field of Classification Search
CPC .................................................... H04W 16/28
See application file for complete search history.

(56) References Cited

U.S. PATENT DOCUMENTS 11,536,795 B1 * 12/2022 Uzes ..................... G01S 3/8006
11,784,693 B1 * 10/2023 Imanilov ................ H04B 7/043
375/252

(Continued)

FOREIGN PATENT DOCUMENTS

AU 2007201112 A1 * 4/2007
CN 1788389 A * 6/2006

(Continued)

OTHER PUBLICATIONS

Guvenc, "Coverage Enhancement for NLOS mmWave Links Using Passive Reflectors," in IEEE Open Journal of the Communications Society, vol. 1, pp. pp. 263-281, 2020.

(Continued)

*Primary Examiner* — Shean Tokuta
(74) *Attorney, Agent, or Firm* — Greenberg Traurig, LLP; Mammen ("Roy") P. Zachariah

(57) ABSTRACT

Optimizing beamforming overhead and improving coverage in a radio access network in a wireless communications system (WCS) is disclosed. Herein, a radio node(s) is configured to radiate multiple radio frequency (RF) beams in a coverage area. Notably, the RF beams can intercept a ground since the radio node(s) is mounted above the ground (e.g., on a ceiling) and facing downward toward the ground. As a result, some of the radiated energy may be wasted to degrade coverage and performance in the coverage area. In this regard, in embodiments disclosed herein, multiple reflector devices (passive and/or active) are provided in proximity to the radio node(s) to intercept the RF beams radiated from the radio node(s) and redirect the intercepted RF beams in parallel to the ground. By redirecting the RF beams horizontally, it is possible to reduce energy waste and enhance beamforming coverage in the radio access network.

20 Claims, 13 Drawing Sheets

(56) References Cited

U.S. PATENT DOCUMENTS

| | | | | |
|---|---|---|---|---|
| 2017/0174231 | A1* | 6/2017 | Bochud | B61F 5/22 |
| 2021/0011369 | A1* | 1/2021 | Xiao | G03B 21/602 |
| 2022/0026576 | A1* | 1/2022 | Baribault | G01S 17/86 |
| 2023/0421241 | A1* | 12/2023 | Meyer | H04B 7/04013 |
| 2024/0118410 | A1* | 4/2024 | Lin | G01S 13/867 |
| 2024/0235635 | A1* | 7/2024 | Zhinong | H01Q 15/0086 |
| 2025/0113307 | A1* | 4/2025 | Raghavan | H04W 52/18 |
| 2025/0142355 | A1* | 5/2025 | Abraha | H04W 16/28 |

FOREIGN PATENT DOCUMENTS

| | | | | | |
|---|---|---|---|---|---|
| CN | 101427486 | B | * | 6/2013 | H01Q 25/00 |
| CN | 113196283 | A | * | 7/2021 | G06V 40/10 |
| CN | 110850437 | B | * | 4/2022 | G01S 7/481 |
| EP | 1918634 | A1 | * | 5/2008 | F21V 7/0008 |
| EP | 3813193 | B1 | * | 9/2023 | H01Q 1/22 |
| JP | 2003035807 | A | * | 2/2003 | G02B 5/04 |
| WO | WO-2016179650 | A1 | * | 11/2016 | H01Q 15/16 |
| WO | WO-2019133195 | A1 | * | 7/2019 | H01P 1/211 |
| WO | WO-2019191537 | A1 | * | 10/2019 | G06V 40/10 |
| WO | WO-2022253534 | A1 | * | 12/2022 | H01Q 3/46 |
| WO | WO-2023137566 | A1 | * | 7/2023 | G01S 7/499 |
| WO | WO-2025071816 | A2 | * | 4/2025 | H04B 7/04013 |

OTHER PUBLICATIONS

Kakishima et al., "Effect of Passive Reflectors for Enhancing Coverage of 28 GHz mmWave Systems in an Outdoor Setting," 2019 IEEE Radio and Wireless Symposium (RWS), Orlando, FL, USA, 2019, pp. 1-4.

Matolak et al., "Effect of Passive Reflectors on the Coverage of IEEE 802.11ad mmWave Systems," 2018 IEEE 88th Vehicular Technology Conference (VTC-Fall), Chicago, IL, USA, 2018, pp. 1-6.

Tie et al., "Shaping flattened scattering patterns in broadband using passive reconfigurable intelligent surfaces for indoor NLOS wireless signal coverage enhancement". ITU Journal on Future and Evolving Technologies., 2023, 4, pp. 50-59.

* cited by examiner

BEAMFORMING COVERAGE OPTIMIZATION IN A RADIO ACCESS NETWORK IN A WIRELESS COMMUNICATIONS SYSTEM (WCS)

BACKGROUND

This disclosure relates generally to optimizing beamforming coverage in a wireless communications system (WCS), which can include a fifth generation (5G) system, a 5G new-radio (5G-NR) system, and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of a radio node/base station that transmits communications signals distributed over physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

Operators of mobile systems, such as the Universal Mobile Telecommunications System (UMTS) and its offspring including Long Term Evolution (LTE) and LTE-Advanced, are increasingly relying on wireless small cell radio access networks (RANs) in order to deploy for example indoor voice and data services to enterprises and other customers. Such small cell RANs typically utilize multiple-access technologies capable of supporting communications with multiple users using RF signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB). A gNodeB (gNB) is a node in a cellular network that provides connectivity between user equipment (UE) and the evolved packet core (EPC).

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station that includes modern functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The WCS 100 may be configured to operate as a 5G and/or a 5G-NR communications system. In this regard, the radio node 102 can function as a 5G or 5G-NR base station (a.k.a. gNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, it is desirable to radiate the RF beams 120(1)-120(N) via RF beamforming to help mitigate signal propagation loss and/or interference.

No admission is made that any reference cited herein constitutes prior art. Applicant expressly reserves the right to challenge the accuracy and pertinency of any cited documents.

SUMMARY

Embodiments disclosed herein include optimizing beamforming coverage in a radio access network in a wireless communications system (WCS). Herein, a radio node(s) is configured to radiate multiple radio frequency (RF) beams in a coverage area. Notably, the RF beams can intercept a ground since the radio node(s) is mounted above the ground (e.g., on a ceiling) and facing downward toward the ground. As a result, some of the radiated energy may be wasted to degrade coverage and performance in the coverage area. In this regard, in embodiments disclosed herein, multiple reflector devices (passive and/or active) are provided in proximity to the radio node(s) to intercept the RF beams radiated from the radio node(s) and redirect the intercepted RF beams in parallel to the ground. By redirecting the RF beams horizontally, it is possible to reduce energy waste and enhance beamforming coverage in the radio access network.

One exemplary embodiment of the disclosure relates to a radio access network. The radio access network includes at least one radio node. The at least one radio node is mounted at a first height relative to a ground. The at least one radio node is configured to radiate a plurality of RF beams each steered toward a respective one of a plurality of primary beam directions intercepting the ground. The radio access network also includes a plurality of reflector devices. Each of the plurality of reflector devices is mounted at a second height lower than the first height relative to the ground. Each of the plurality of reflector devices is configured to intercept and redirect a respective one of the plurality of RF beams to a respective one of a plurality of secondary beam directions parallel to the ground.

An additional exemplary embodiment of the disclosure relates to a method for optimizing beamforming coverage in a radio access network in a WCS. The method includes radiating a plurality of RF beams each steered toward a respective one of a plurality of primary beam directions intercepting a ground. The method also includes redirecting the plurality of RF beams to a plurality of secondary beam directions parallel to the ground.

An additional exemplary embodiment of the disclosure relates to a WCS. The WCS includes a radio access network. The radio access network is coupled to a service node. The radio access network includes at least one radio node. The at least one radio node is mounted at a first height relative to a ground. The at least one radio node is configured to radiate a plurality of RF beams each steered toward a respective one of a plurality of primary beam directions intercepting the ground. The radio access network also includes a plurality of reflector devices. Each of the plurality of reflector devices is mounted at a second height lower than the first height relative to the ground. Each of the plurality of reflector devices is configured to intercept and redirect a respective one of the plurality of RF beams to a respective one of a plurality of secondary beam directions parallel to the ground.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include optimizing beamforming coverage in a radio access network in a wireless communications system (WCS). Herein, a radio node(s) is configured to radiate multiple radio frequency (RF) beams in a coverage area. Notably, the RF beams can intercept a ground since the radio node(s) is mounted above the ground (e.g., on a ceiling) and facing downward toward the ground. As a result, some of the radiated energy may be wasted to degrade coverage and performance in the coverage area. In this regard, in embodiments disclosed herein, multiple reflector devices (passive and/or active) are provided in proximity to the radio node(s) to intercept the RF beams radiated from the radio node(s) and redirect the intercepted RF beams in parallel to the ground. By redirecting the RF beams horizontally, it is possible to reduce energy waste and enhance beamforming coverage in the radio access network.

Figure 1:
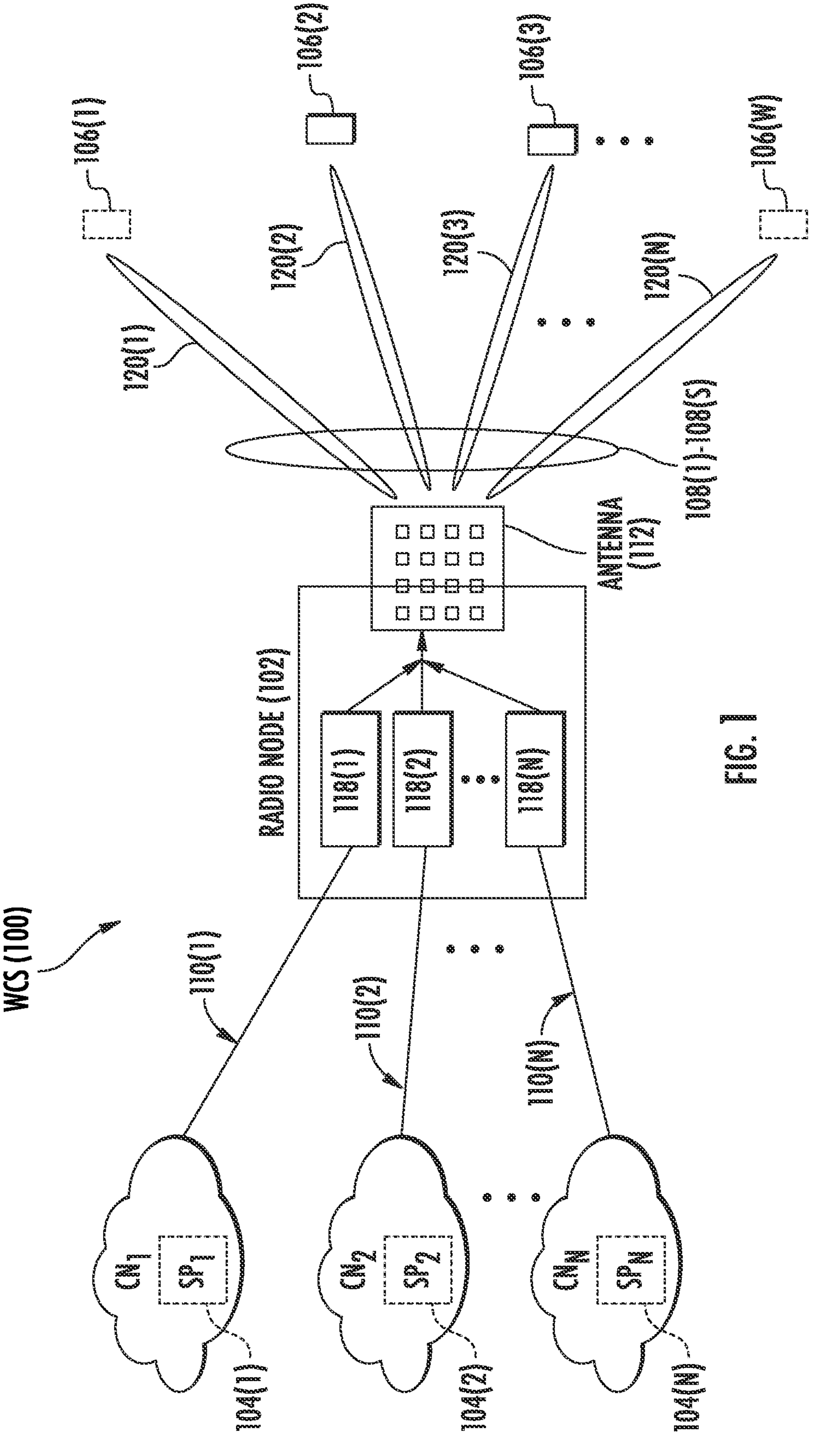
FIG. 1 is a schematic diagram of an exemplary wireless communications system (WCS), such as a radio access network (RAN), configured to communicate communications signals with user devices via radio frequency (RF) beamforming.
Figure 2A:
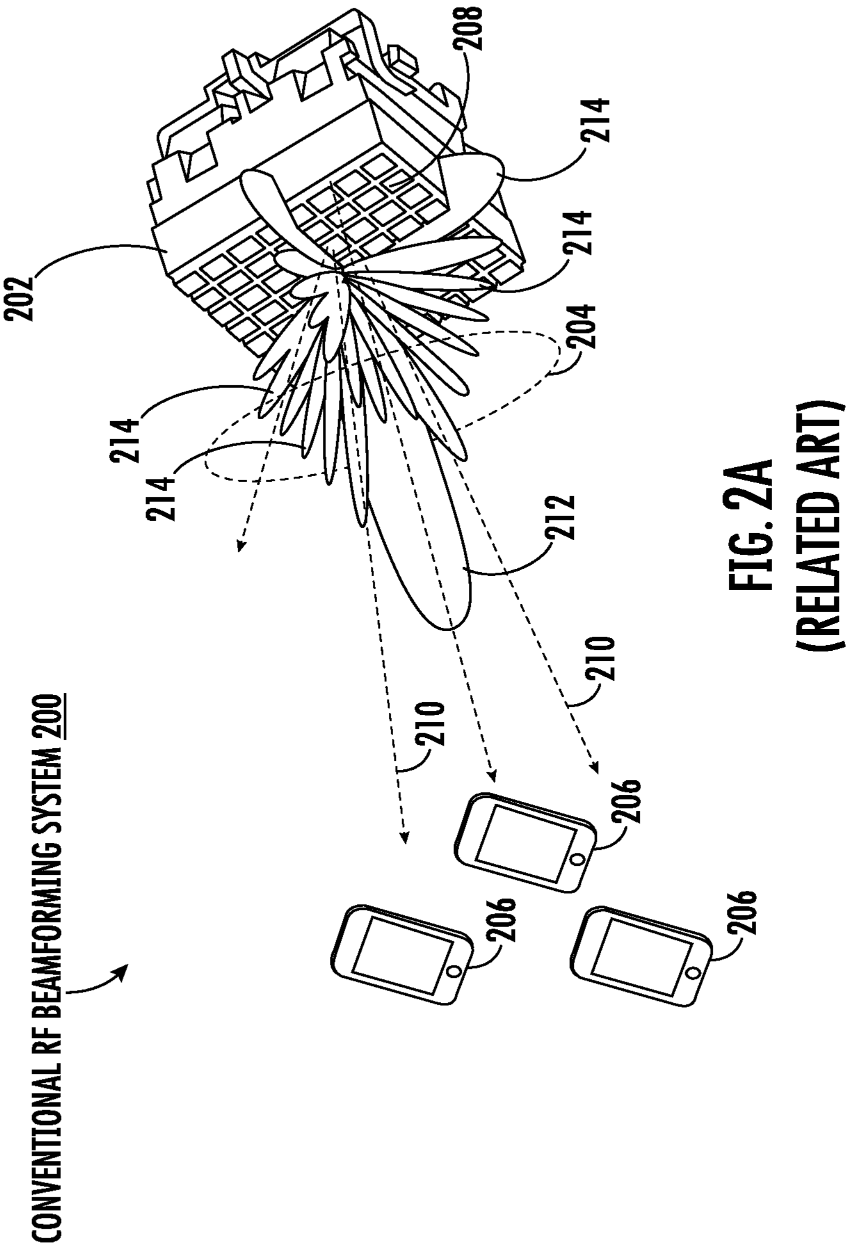
FIG. 2A (RELATED ART)
FIGS. 2A-2B are schematic diagrams providing exemplary illustrations of some fundamental aspects related to RF beamforming.
Figure 2B:
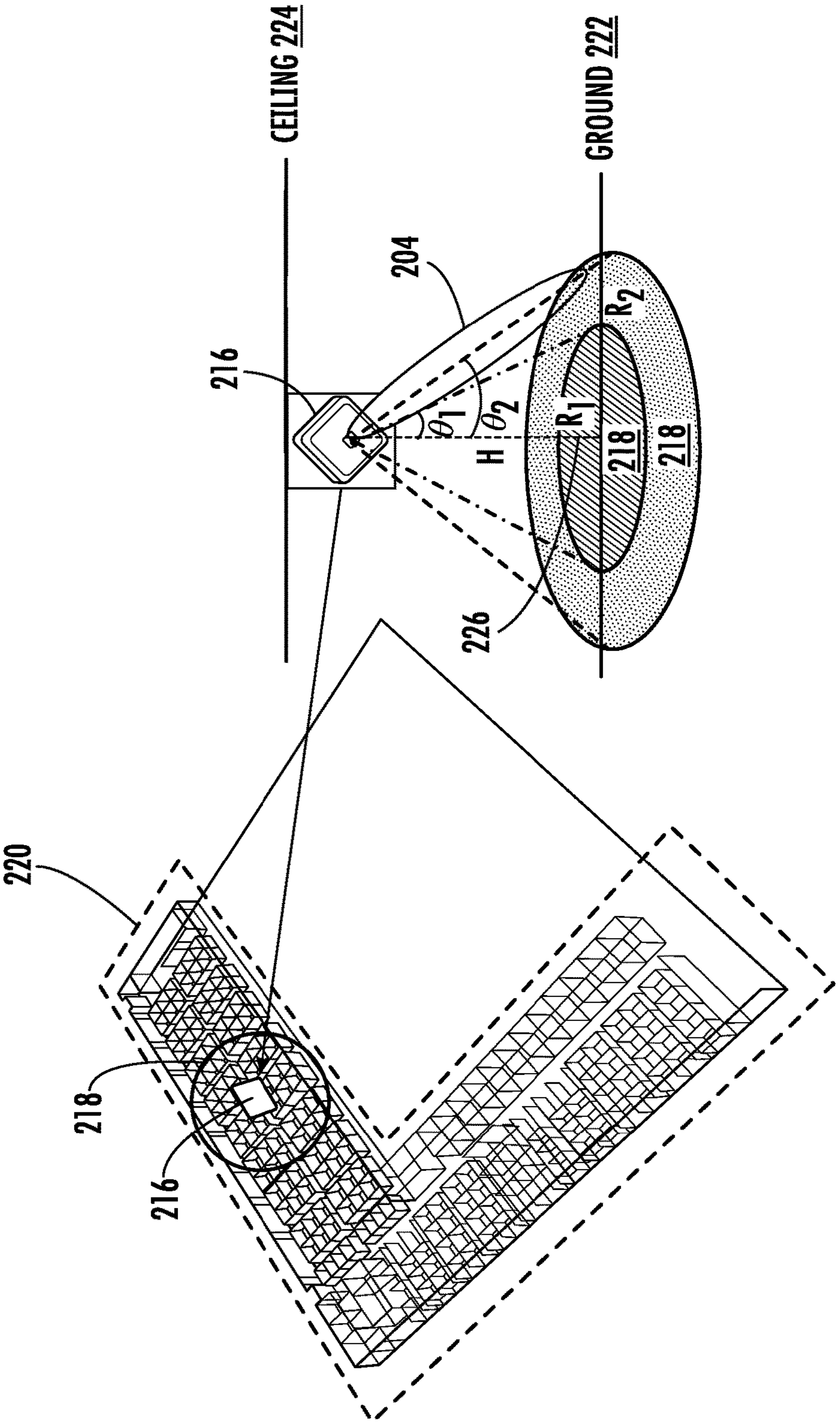
FIG. 2B (RELATED ART)
Figure 3:
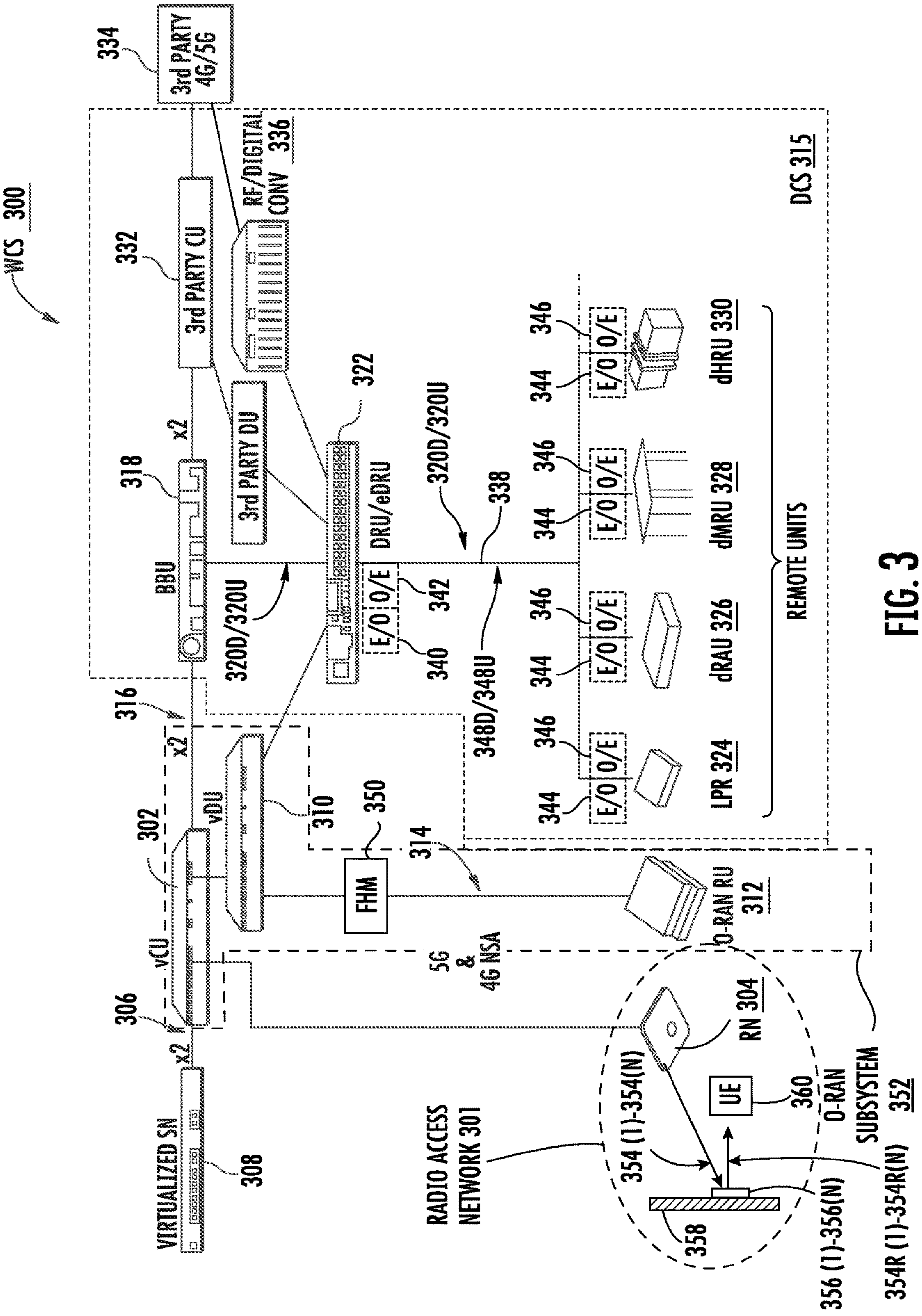
FIG. 3 is a schematic diagram of an exemplary WCS configured according to any of the embodiments disclosed herein to optimize beamforming coverage in a radio access network.

Before discussing a radio access network in a WCS that is configured to optimize beamforming coverage, starting at FIG. 3, a brief overview of a conventional beamforming system is first provided with reference to FIGS. 2A-2B to help explain some fundamental aspects related to RF beamforming.

FIG. 2A is a schematic diagram of an RF beamforming system 200 wherein an antenna array 202 emits an RF beam(s) 204 toward one or more user devices 206. The antenna array 202 includes multiple antenna elements 208 that are typically separated from each other by a distance (a.k.a. "antenna spacing"). The RF beam(s) 204 emitted from the antenna elements 208 includes multiple beamforming signals (not shown). The beamforming signals are preprocessed based on a set of complex-valued coefficients, which is commonly known as a beamforming codeword, and/or further processed to provide phase and/or amplitude changes as needed. Specifically, multiplication of the beamforming codeword is realized by a combination of digital processing and through phase and/or amplitude control applied at an input of the antenna elements 208 to thereby maximize an array gain in a desired beam direction(s) 210. By applying the set of complex-valued coefficients to the beamforming signals, the multiple simultaneously emitted beamforming signals can form the RF beam(s) 204, which may be multiple RF beams each described by gain, intensity, power, and/or electric/magnetic field values versus elevation and azimuth directions. In this regard, it can be said that the RF beam(s) 204 is associated with, or defined by, a respective beamforming codeword. Accordingly, a set of different beamforming codewords, often referred to as a beamforming codebook, can define multiple different RF beams in multiple beam directions.

Notably, the RF beam(s) 204 often includes a main lobe 212, where radiated power is concentrated and close to a maximum radiated power, and one or more sidelobes 214 with lesser amounts of radiated power. Typically, a radiation direction of the main lobe 212 determines the desired beam direction(s) 210 of the RF beam(s) 204, and a beamwidth of the RF beam(s) 204 is defined by a collection of radiation directions wherein the radiated power is not lower than 3 dB from the maximum radiated power. Understandably, the narrower the beamwidth, the more concentrated the radiated power will be in the main lob 212 and, thus, the farther distance the main lob 212 will be able to propagate. In contrast, the wider the beamwidth, the more spread the radiated power will be in the main lob 212 and, thus, the shorter distance the main lob 212 will be able to propagate. In this regard, the beamwidth of the RF beam(s) 204 is inversely related to propagation distance of the RF beam(s) 204.

The antenna array 202 can be provided in a radio node (e.g., eNB, gNB) to provide wireless communication services in a radio access network. FIG. 2B is a schematic diagram of an exemplary radio node 216 that includes the antenna array 202 in FIG. 2A and configured to radiate multiple RF beams 204 in a coverage cell 218. Common elements between FIGS. 2A and 2B are shown therein with common element numbers and will not be re-described herein.

In an example, the radio node 216 can be provided in an indoor environment 220 (e.g., an office area). Specifically, the radio node 216 may mounted at a height H relative to a ground 222 (e.g., on a ceiling 224) and face downward toward the ground 222. The radio node 216 includes beamforming processing circuitry (not shown) that forms and steers the RF beams 204 based on predetermined beamform codewords. As an example, the radio node 216 can use different beamforming codewords to steer the RF beams 204 with different steering angles $\theta_1$ and $\theta_2$ ($\theta_2>\theta_1$) relative to a vertical axis 226.

Notably from FIG. 2B, when the radio node 216 steers the RF beams 204 with steering angles $\theta_1$ and $\theta_2$, the coverage cell 218 will be associated with radiuses $R_1$ and $R_2$ ($R_2>R_1$), respectively. In other words, the radius R (e.g., $R_1$ or $R_2$) of the coverage cell 218 appears to be positively related to the steering angle θ (e.g., $\theta_1$ or $\theta_2$). In this regard, it may be convenient to think that it is possible to extend the radius R of the coverage cell 218 by increasing the steering angle. However, this is proven not to be the case for several reasons.

First, although the antenna array 202 in the radio node 216 can be mounted with a tilt angle, the steering angles $\theta_1$ and $\theta_2$ are limited to less than or equal to sixty degrees ($\theta_1$ and $\theta_2 \leq 60°$). Accordingly, the maximum radius R of the coverage cell 218 is limited by equation (Eq. 1) below.

$$R = H \times \tan(\theta) \quad \text{(Eq. 1)}$$

According to equation (Eq. 1), the radius R will be limited because the height H of the ceiling 224 and the steering angle θ are both limited. In addition, when the steering angle θ increases, the beamwidth of the RF beams 204 may become wider as well. As a result, the power level of the RF beams 204 may be significantly reduced at an outer edge of the coverage cell 218. Worse still, since the antenna array 202 in the radio node 216 is facing downward, the RF beams 204 will inevitably hit the ground 222 and be bounced by the ground 222 in random directions. Consequently, some of the radiated energy in the RF beams 204 may become wasted.

Given that the radius R of the coverage cell 218 may be limited due to the factors described above, it will be necessary to deploy many radio nodes 216 to provide adequate coverage throughout the indoor environment 220. However, adding more radio nodes 216 in the indoor environment 220 can lead to considerable increase in costs, processing overheads (e.g., handover overhead), and inter-cell interferences. As such, it is desirable to optimize beamforming coverage in the indoor environment 220 without having to deploy a larger number of the radio nodes 216.

As described in detail below, a set of reflector devices (passive and/or active) can be provided in a radio access network (e.g., small cell, picocell, femtocell, etc.) to each intercept and redirect a respective RF beam radiated by a radio node (e.g., base station, access point, etc.) in the radio access network. More specifically, the reflector devices can be so configured according to embodiments of the present disclosure to reflect the respective RF beam toward a desired beam direction and with a desired beamwidth (horizontal and vertical beamwidth) to maximize coverage in the radio access network. As a result, it is possible to employ a fewer number of radio nodes to help reduce cost, overhead, and energy waste in the radio access network.

FIG. 3 is a schematic diagram of an exemplary WCS 300, a radio access network 301 can be configured according to any of the embodiments disclosed herein to optimize beamforming coverage. The WCS 300 supports both legacy 4G LTE, 4G/5G non-standalone (NSA), and 5G standalone communications systems. As shown in FIG. 3, a centralized services node 302 (a.k.a. CU) is provided and is configured to interface with a core network to exchange communications data and distribute the communications data as radio signals to various wireless nodes. In this example, the centralized services node 302 is configured to support distributed communications services to a radio node 304 (e.g., 5G or 5G-NR gNB). Despite the fact that only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In an embodiment, the DU 310 can be coupled to the O-RAN RUs 312 via a front-haul multiplexer (FHM) 350. In this regard, the CU 302, the DU 310, the FHM 350, and the O-RAN RUs 312 collectively form an O-RAN subsystem 352 in the WCS 300. Accordingly, the O-RAN subsystem 352 can be configured to operate based on the O-RAN shared-cell topology to support multiple RU clusters.

In an embodiment, the RN 304 may be configured to radiate a set of RF beams 354(1)-354(N) in the radio access network 301. In addition, a set of reflector devices 356(1)-356(N) can be provided (e.g., mounted on a wall 358) in the radio access network 301 to each intercept and reflect a respective one of the RF beams 354(1)-354(N) toward at least one user equipment (UE) 360. Specifically, each of the reflector devices 356(1)-356(N) will redirect the respective one of the RF beams 354(1)-354(N) to thereby cause a respective one of a set of reflected RF beams 354R(1)-354R(N) toward the UE 360. As further described in FIGS. 4A-4D, the reflector devices 356(1)-356(N) can be provided at selected locations and configured, either statically or dynamically, to steer the reflected RF beams 354R(1)-354R(N) in desired beam directions and with desired beamwidths to thereby maximum beamforming coverage in the radio access network 301.

Figure 4A:
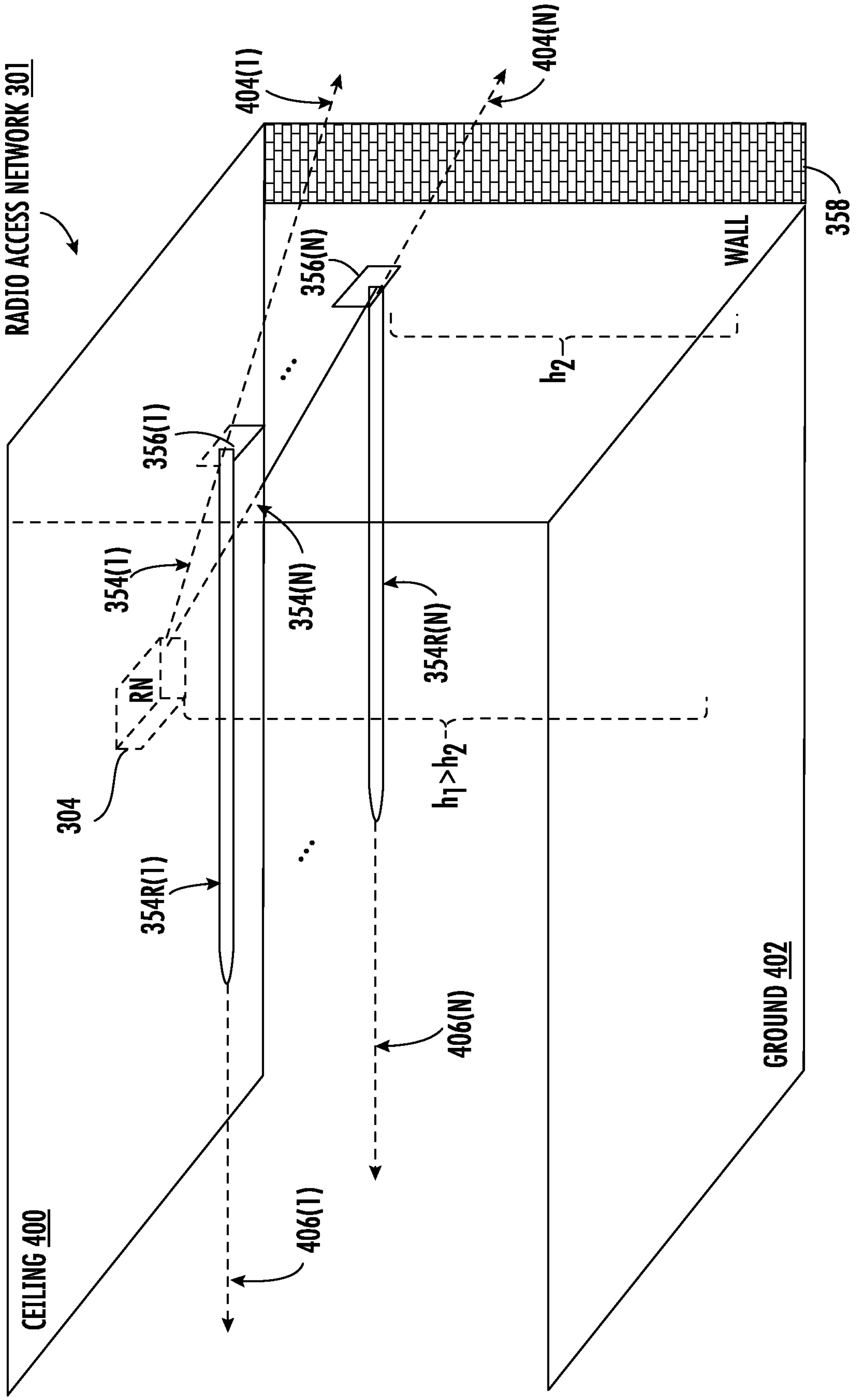
FIGS. 4A-4D are schematic diagrams providing an exemplary illustration as to how the radio access network in the WCS of FIG. 3 can be optimized to improve beamforming coverage.

FIG. 4A is a schematic diagram providing an exemplary three-dimensional (3D) view of the radio access network 301 in the WCS 300 of FIG. 3. Common elements between FIGS. 3 and 4A are shown therein with common element numbers and will not be re-described herein.

Herein, the RN 304 is mounted on a ceiling 400 with a height $h_1$ relative to a ground 402. The reflector devices 356(1)-356(N), on the other hand, are each mounted on the wall 358 with a respective height $h_2$ relative to the ground 402. According to an embodiment of the present disclosure, the RN 304 is mounted above each of the reflector devices 356(1)-356(N), relative to the ground 402 ($h_1>h_2$).

According to an embodiment of the present disclosure, the radio node 304 is configured to steer each of the RF beams 354(1)-354(N) in a respective one of a plurality of primary beam directions 404(1)-404(N). In an embodiment, the radio node 304 may steer each of the RF beams 354(1)-354(N) in the respective one of the primary beam directions 404(1)-404(N) based on a respective one of a set of predetermined beamforming codewords to ensure that each of the reflector devices 356(1)-356(N) can intercept a respective one of the RF beams 354(1)-354(N).

Upon intercepting a respective one of the RF beams 354(1)-354(N), each of the reflector devices 356(1)-356(N) will reflect the intercepted one of the RF beams 354(1)-354(N) as a respective one of the reflected RF beams 354R(1)-354R(N) in a respective one of a plurality of secondary beam directions 406(1)-406(N). According to an embodiment of the present disclosure, each of the secondary beam directions 406(1)-406(N) is parallel to the ground 402. Studies have shown that, by steering the reflected RF beams 354R(1)-354R(N) in parallel to the ground 402, the reflected RF beams 354R(1)-354R(N) can reach more UEs in the radio access network 301 to thereby maximize beamforming coverage in the radio access network 301.

In one embodiment, each of the reflector devices 356(1)-356(N) can be a passive reflector that is made of a metal plate with a diffraction structure on the surface, a convex metal plate, or a frequency selective surface (FSS) with meta-surface structure. In this regard, each of the reflector devices 356(1)-356(N) can be statically configured (a.k.a. preconfigured) to cause a respective one of the reflected RF beams 354R(1)-354R(N) to be steered toward the respective one of the secondary beam directions 406(1)-406(N) and with a desired beamwidth.

In another embodiment, each of the reflector devices 356(1)-356(N) can be an active reflector, such as a reconfigurable intelligent surface (RIS). In this regard, each of the reflector devices 356(1)-356(N) can be dynamically configured to cause a respective one of the reflected RF beams 354R(1)-354R(N) to be steered toward the respective one of the secondary beam directions 406(1)-406(N) and with the desired beamwidth.

In yet another embodiment, the reflector devices 356(1)-356(N) can be a combination of passive and active reflectors. In this regard, the reflector devices 356(1)-356(N) can be statically and/or dynamically configured to cause the reflected RF beams 354R(1)-354R(N) to be steered toward the secondary beam directions 406(1)-406(N) and with the desired beamwidths.

Figure 4B:
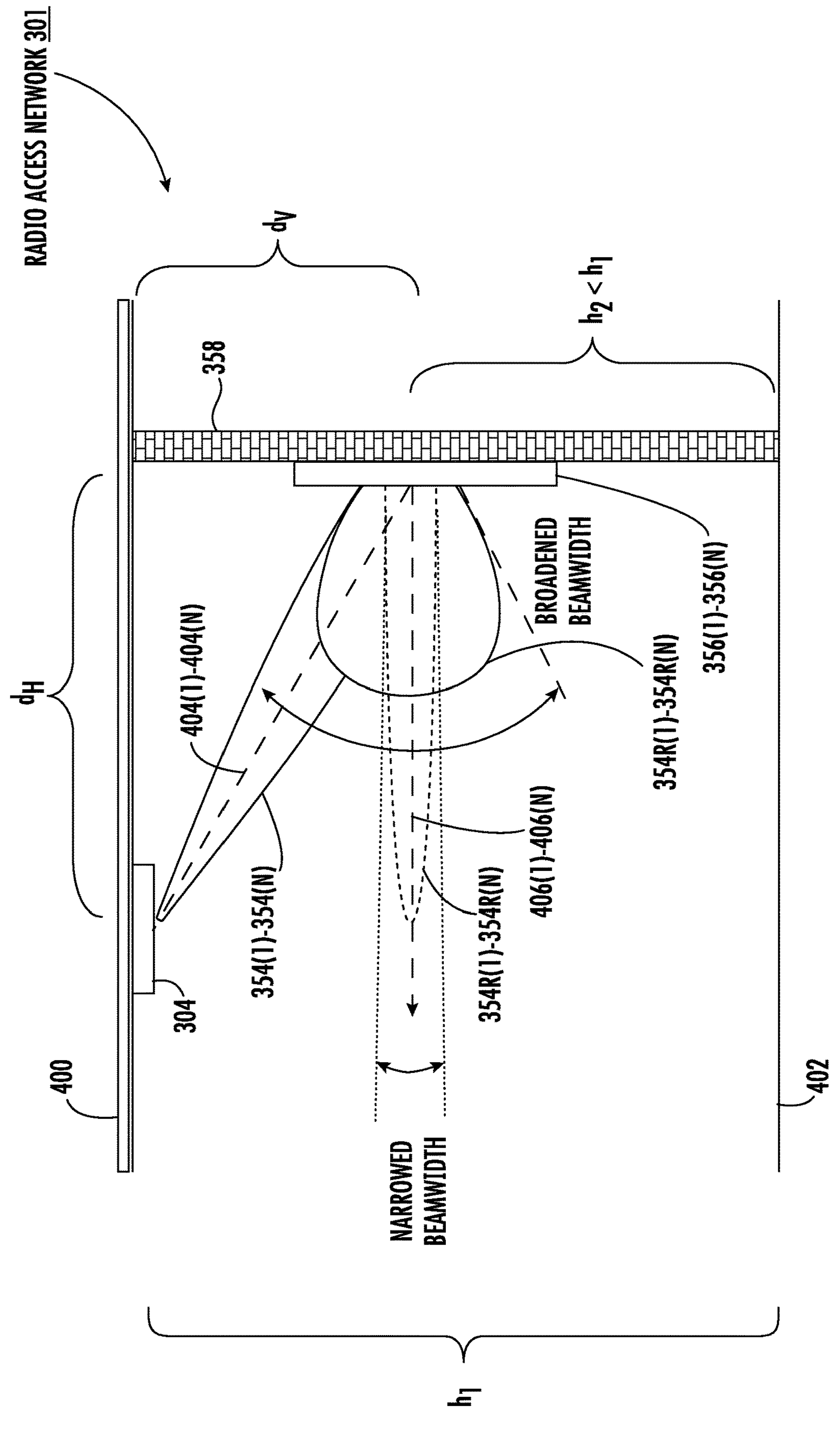

According to an embodiment of the present disclosure, each of the reflector devices 356(1)-356(N) is collocated with the radio node 304 to help reduce unnecessary propagation loss in the RF beams 354(1)-354(N). In this regard, FIG. 4B is a schematic diagram providing an exemplary side view of the radio access network 301 in FIGS. 3 and 4A. Common elements between FIGS. 3, 4A, and 4B are shown therein with common element numbers and will not be re-described herein.

As shown in FIG. 4B, each of the reflector devices 356(1)-356(N) is provided at a respective horizontal distance $d_H$ and a respective vertical distance $d_V$ relative to the radio node 304. In context of the present disclosure, each of the reflector devices 356(1)-356(N) is collocated with the radio node 304 when the respective horizontal distance $d_H$ and the respective vertical distance $d_V$ are each less than one meter (1 m) ($d_H$<1 m and $d_V$<1 m).

To help optimize beamforming coverage in the radio access network 301, the respective height $h_2$ of each of the reflector devices 356(1)-356(N) can be so determined based on an average height of a UE(s) in the radio access network 301. In one embodiment, when there is no blockage between each of the reflector devices 356(1)-356(N) and the UE (a.k.a. line-of-sight condition), the respective height $h_2$ of each of the reflector devices 356(1)-356(N) can be equal to the average height of the UE. Should there be any blockage between each of the reflector devices 356(1)-356(N) and the UE, it is preferrable for the respective height $h_2$ of each of the reflector devices 356(1)-356(N) to be one-half meter (0.5 m) above the average height of the UE. Further, each of the reflector devices 356(1)-356(N) may be statically and/or dynamically configured to cause a respective one of the reflected RF beams 354R(1)-354R(N) to be associated with a broadened or a narrowed beamwidth depending on specific environmental layouts and coverage scenarios of the radio access network 301.

For practical reasons, it is preferrable to make each of the reflector devices 356(1)-356(N) smaller. In this regard, a codebook with a narrow beamwidth and high effective isotropic radiated power (EIRP) can be used to form the respective one of the reflected RF beams 354R(1)-354R(N) to thereby help reduce the size of the reflector devices 356(1)-356(N) and improve reflected power. In addition, each of the reflector devices 356(1)-356(N) can be made with low-loss material and a better reflection efficiency to help improve reflection efficiency of the reflector devices 356(1)-356(N).

In an embodiment, each of the reflected RF beams 354R (1)-354R(N) can be so formed with a respective horizontal beamwidth and a respective vertical beamwidth. Herein, the horizontal beamwidth refers to a half-power beamwidth (HPBW) on a horizontal plane parallel to the ground 402 and the vertical beamwidth refers to an HPBW on a vertical plane perpendicular to the ground 402.

Figure 4D:
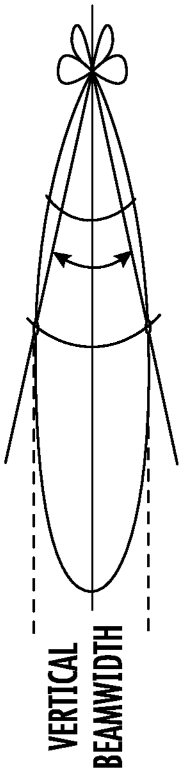
Figure 4C:
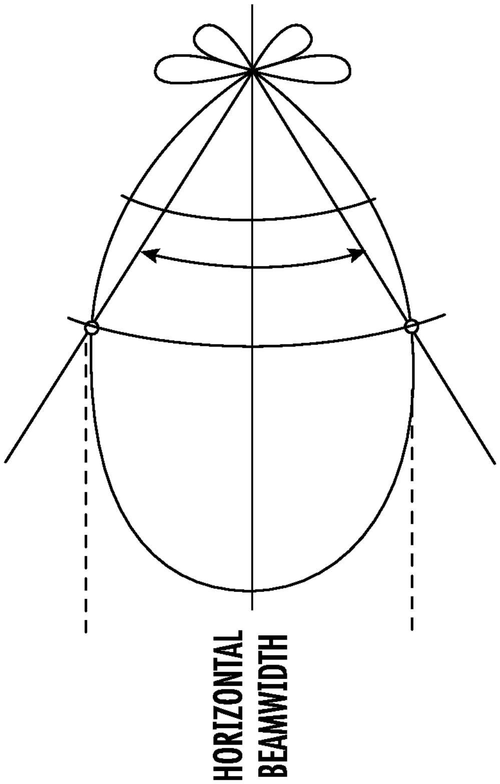

As illustrated in FIGS. 4C and 4D, each of the reflected RF beams 354R(1)-354R(N) can be associated with a broader horizontal beamwidth and a narrower vertical beamwidth. Understandably, the broader horizontal beamwidth can broaden coverage across the horizontal plane whereas the narrower vertical beamwidth can help reduce energy spread in the vertical plane. In an embodiment, optimized phase engineering in the design of the reflector devices 356(1)-356(N) can be used to create a well defined beam shape (e.g., broader horizontal beamwidth and narrower vertical beamwidth) with minimum wasted energy from sidelobes.

All in all, an optimization of the height $h_1$, the height $h_2$, the horizontal distance $d_H$, the vertical distance $d_V$, the codebook, the reflector size, and/or reflection efficiency makes it possible to capture maximum RF power density on the reflector surface and redirect efficiently the captured energy in parallel to the ground 402. Radio propagation tools, such as ray tracing, can be used to optimize the height ($h_1$ and/or $h_2$) and location ($d_H$ and/or $d_V$) of the reflector devices 356(1)-356(N) for a given environment, codebook, and location of the radio node 304.

Figure 5:
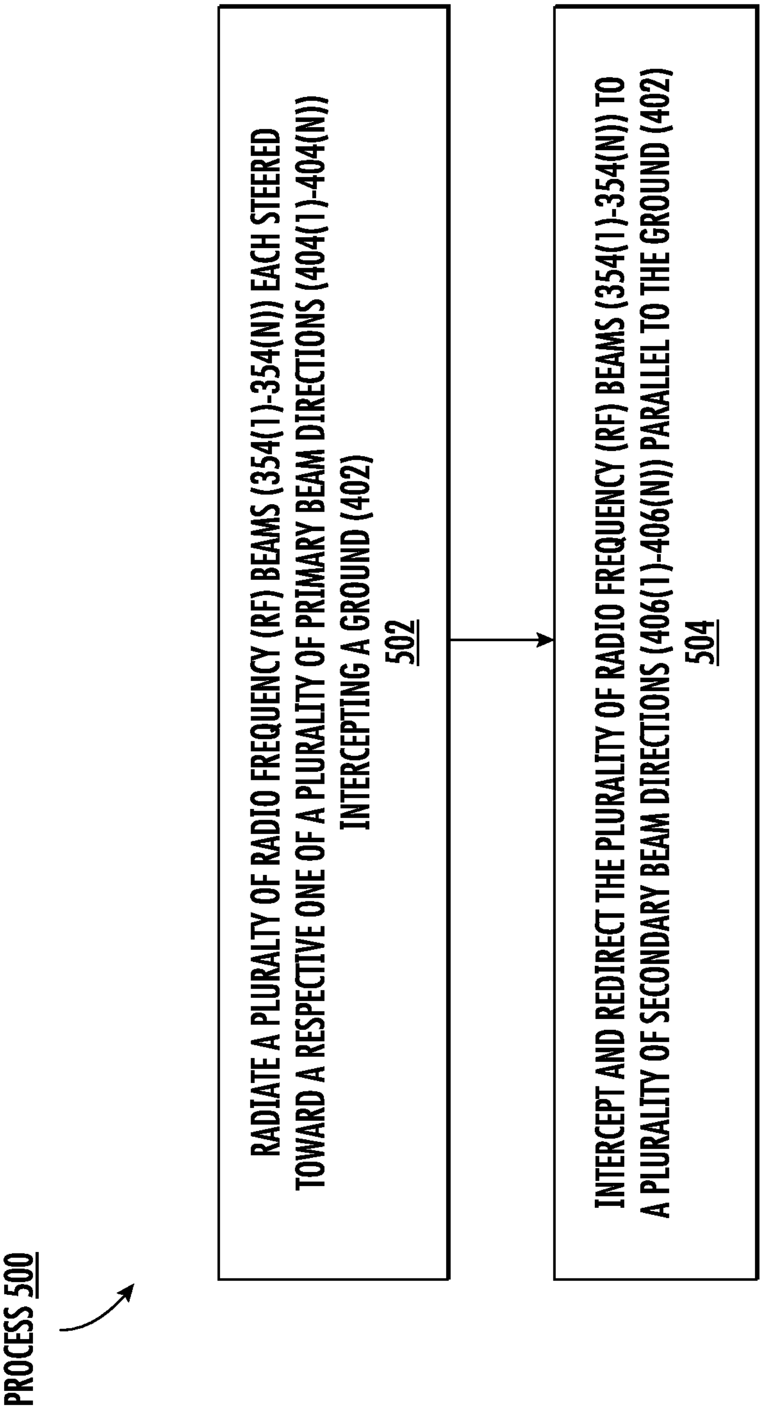
FIG. 5 is a flowchart of an exemplary process for optimizing beamforming coverage in the radio access network in FIG. 3.

In an embodiment, the radio access network 301 in FIGS. 3, 4A, and 4B can be configured to optimize beamforming coverage according to a process. In this regard, FIG. 5 is a flowchart of an exemplary process 500 for optimizing beamforming coverage in the radio access network 301 in FIGS. 3, 4A, and 4B.

Herein, the radio node 304 is configured to radiate and steer each of the RF beams 354(1)-354(N) toward a respective one of the primary beam directions 404(1)-404(N) that intercepts the ground 402 (block 502). The reflector devices 356(1)-356(N) are configured to intercept and redirect the RF beams 354(1)-354(N) to the secondary beam directions 406(1)-406(N) that are parallel to the ground 402 (block 504).

Figure 6:
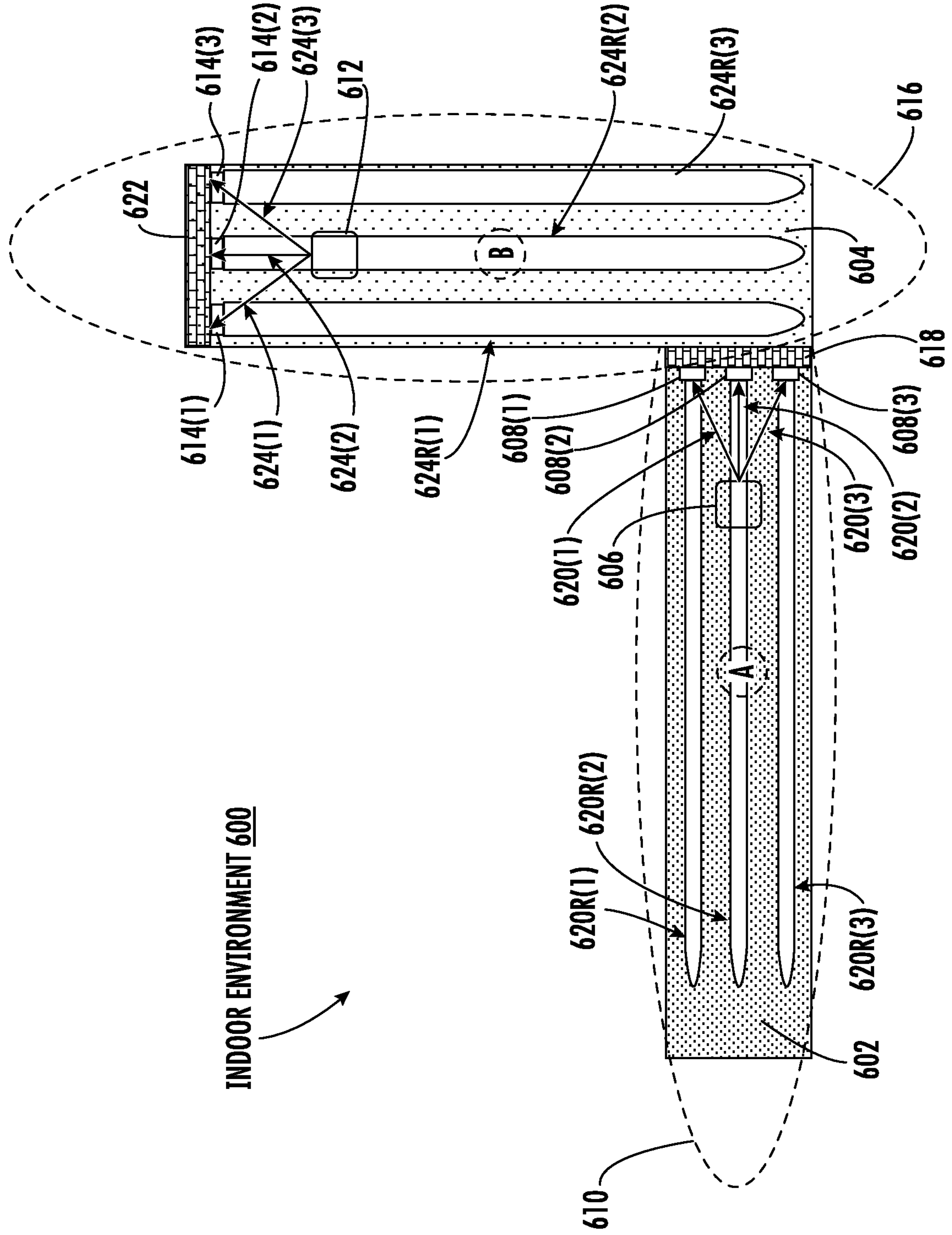
FIG. 6 is a schematic diagram providing an exemplary illustration as to how beamforming coverage can be optimized in an indoor environment according to embodiments of the present disclosure.

In an embodiment, the radio access network 301 in FIGS. 3, 4A, and 4B can be deployed in an indoor environment (e.g., office building, stadium, etc.). In this regard, FIG. 6 is a schematic diagram of an exemplary indoor environment 600 wherein the radio access network 301 in FIGS. 3, 4A, and 4B can be configured to optimize beamforming coverage throughout the indoor environment 600. Common elements between FIGS. 3, 4A, 4B, and 6 are shown therein with common element numbers and will not be re-described herein. Notably, the indoor environment 600 is provided herein for illustration only, and may not be drawn to scale.

Herein, the indoor environment 600 is divided into a first coverage area 602 and a second coverage area 604. The first coverage area 602 includes a first radio node 606 and a first set of reflector devices 608(1)-608(3) that collectively provide a first radio access network 610. The second coverage area includes a second radio node 612 and a second set of reflector devices 614(1)-614(3) that collectively provide a second radio access network 616.

Herein each of the first radio access network 610 and the second radio access network 616 is configured according to the radio access network 301 in FIGS. 3, 4A, and 4B. Accordingly, the first radio node 606 and the second radio node 612 are identical to the radio node 304 in the radio access network 301 in FIGS. 3, 4A, and 4B. Likewise, the first set of reflector devices 608(1)-608(3) and the second set of reflector devices 614(1)-614(3) are identical to the reflector devices 356(1)-356(N) in the radio access network 301 in FIGS. 3, 4A, and 4B.

In an embodiment, the first set of reflector devices 608 (1)-608(3) are mounted on a first wall 618 and collocated with the first radio node 606. The first radio node 606 radiates and steers a first set of RF beams 620(1)-620(3) toward the first set of reflector devices 608(1)-608(3), respectively. The first set of reflector devices 608(1)-608(3), in turn, reflect the first set of RF beams 620(1)-620(3) in the first radio access network 610 as a first set of reflected RF beams 620R(1)-620R(3), respectively.

Similarly, the second set of reflector devices 614(1)-614 (3) are mounted on a second wall 622 and collocated with the second radio node 612. The second radio node 612 radiates and steers a second set of RF beams 624(1)-624(3) toward the second set of reflector devices 614(1)-614(3), respectively. The second set of reflector devices 614(1)-614 (3), in turn, reflect the second set of RF beams 624(1)-624(3) in the second radio access network 616 as a second set of reflected RF beams 624R(1)-624R(3), respectively.

Notably, by configuring each of the first radio access network 610 and the second radio access network 616 in accordance with the embodiments disclosed with respect to the radio access network 301 in FIGS. 3, 4A, and 4B, it is possible to optimize overall beamforming coverage in the indoor environment 600. In this regard, FIG. 7 is a graphic diagram providing an exemplary illustration of the coverage improvement in the indoor environment 600 of FIG. 6.

Figure 7:
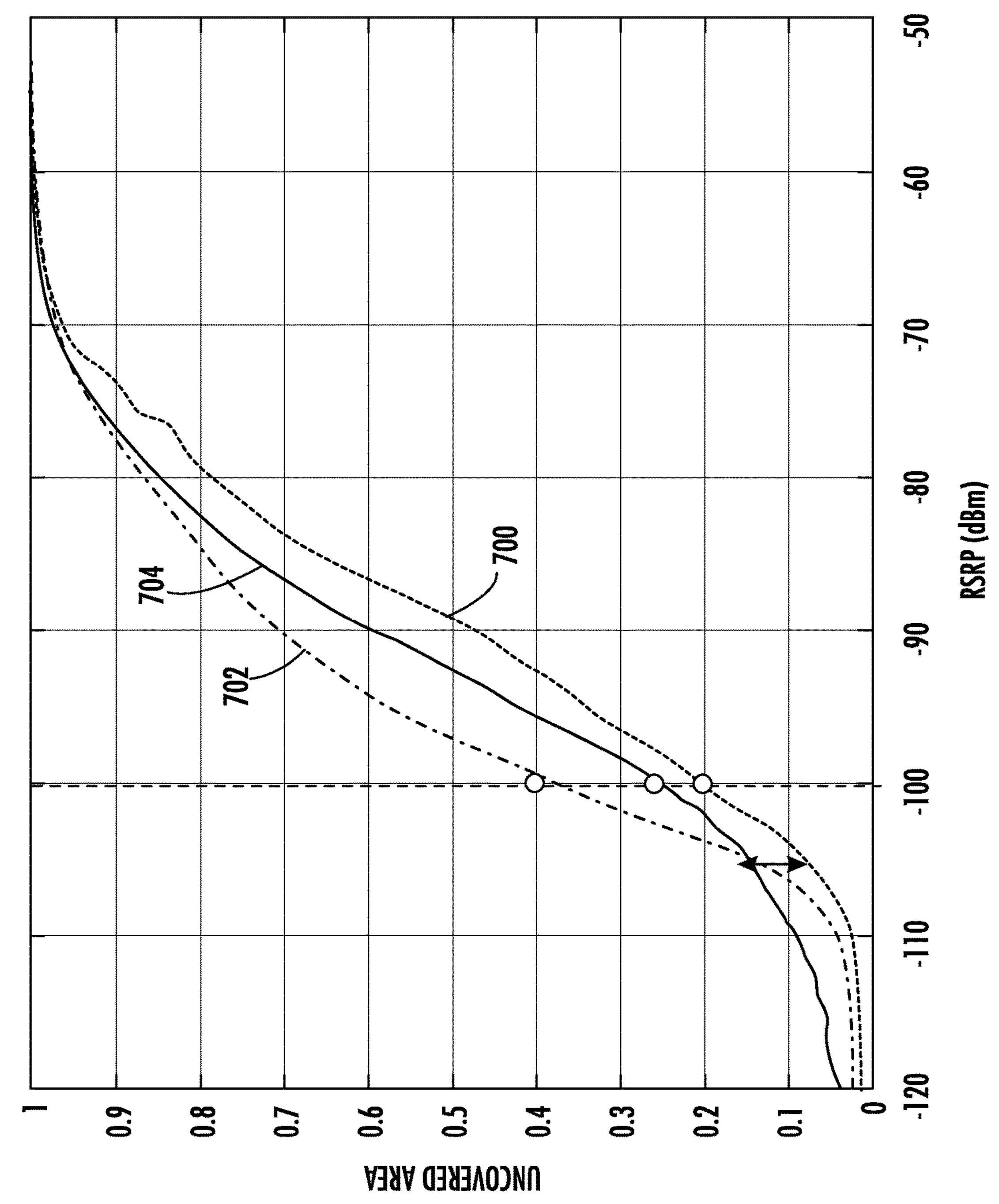
FIG. 7 is a graphic diagram providing exemplary illustration of beamforming coverage improvement in the indoor environment of FIG. 6.

FIG. 7 illustrates three curves 700, 702, and 704 each plotted to represent a respective overall uncovered area in the indoor environment 600 at various reference signal received powers (RSRPs). Specifically, the curve 700 establishes a relationship between an uncovered area and an RSRP under a first configuration scenario, wherein the first radio access network 610 and the second radio access network 616 are each configured as illustrated in FIG. 6. The curve 702 establishes a relationship between the uncovered area and the RSRP under a second configuration scenario, wherein the first set of reflector devices 608(1)-608(3) and the second set of reflector devices 614(1)-614(3) are removed from the first radio access network 610 and the second radio access network 616 in FIG. 6. The curve 704 establishes a relationship between the uncovered area and the RSRP under a third configuration scenario, wherein not only the first set of reflector devices 608(1)-608(3) and the second set of reflector devices 614(1)-614(3) are removed from the first radio access network 610 and the second radio access network 616 in FIG. 6, but the first radio node 606 and the second radio node 612 are also relocated to respective center points A and B in the first coverage area 602 and the second coverage area 604.

As an example, when the RSRP is at −100 dBm, the overall uncovered area in the indoor environment 600 under the first, second, and third configuration scenarios is 20%, 40%, and 25%, respectively. It is thus evident that the first radio access network 610 and the second radio access network 616, as configured according to embodiments disclosed herein, can provide optimized beamforming coverage in the indoor environment 600.

Figure 8:
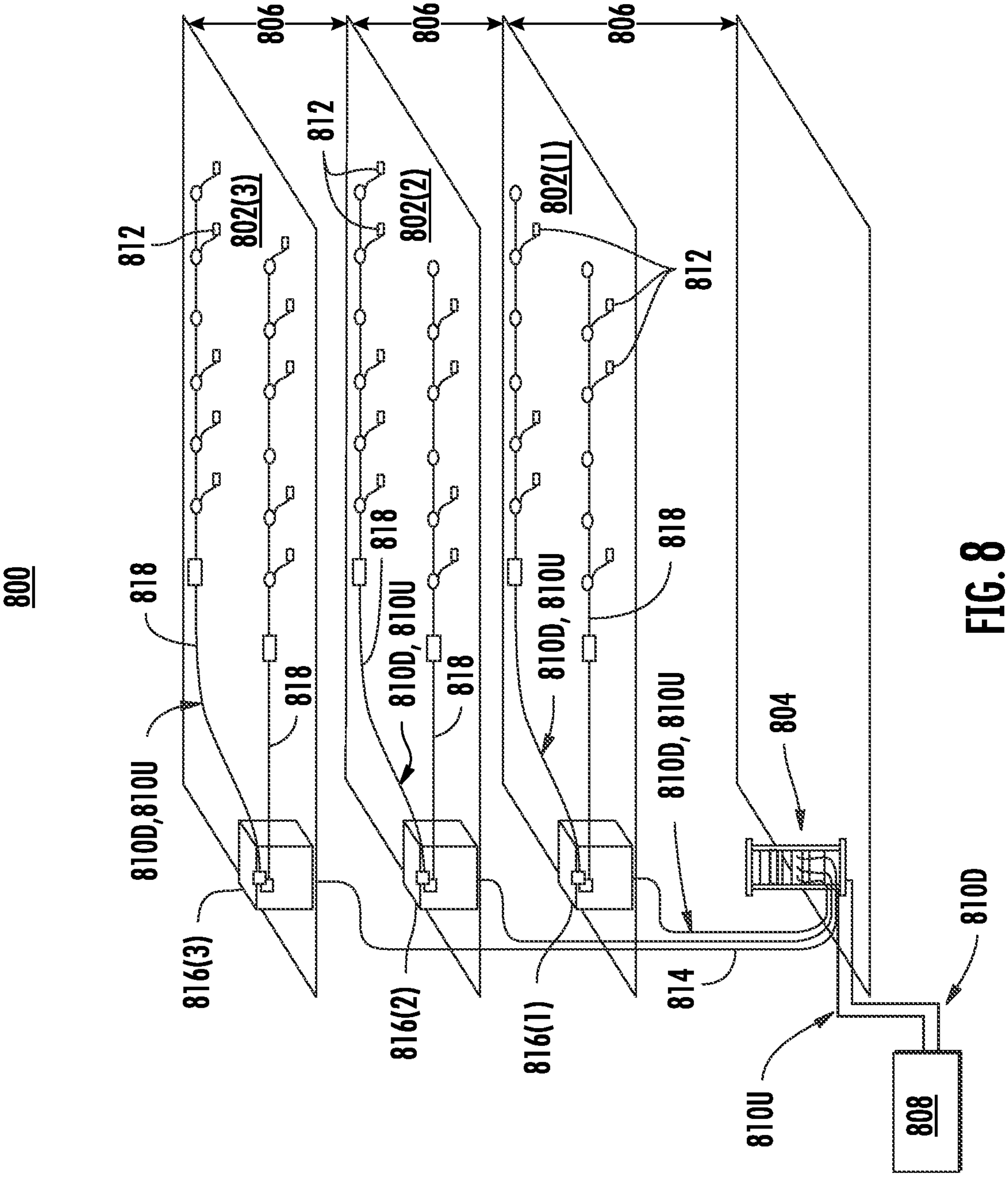
FIG. 8 is a partial schematic cut-away diagram of an exemplary building infrastructure that includes the radio access network in FIG. 3 configured to optimize beamforming coverage.

FIG. 8 is a partial schematic cut-away diagram of an exemplary building infrastructure 800 that includes an exemplary RAN system 802, including but not limited to the radio access network 301 in FIGS. 3, 4A, and 4B, wherein the RAN system 802 includes multiple RANs 804 implemented according to a RAN standard (e.g., O-RAN standard) and each configured to transparently interface with shared RUs through an intermediary neutral host agent device. The building infrastructure 800 in this embodiment includes a first (ground) floor 802(1), a second floor 802(2), and a third floor 802(3). The floors 802(1)-802(3) are serviced by one or more RANs 804 to provide antenna coverage areas 806 in the building infrastructure 800. The RANs 804 are communicatively coupled to a core network 808 to receive downlink communications signals 810D (downlink communications signals 810D can include downlink channels) from the core network 808. The RANs 804 are communicatively coupled to a respective plurality of RUs 812 to distribute the downlink communications signals 810D to the RUs 812 and to receive uplink communications signals 810U (uplink communications signals 810U can include uplink channels) from the RUs 812, as previously discussed above. Any RU 812 can be shared by any of the multiple RANs 804.

The downlink communications signals 810D and the uplink communications signals 810U communicated between the RANs 804 and the RUs 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the RUs 812 and also provide power to the RUs 812 via array cables 818.

Figure 9:
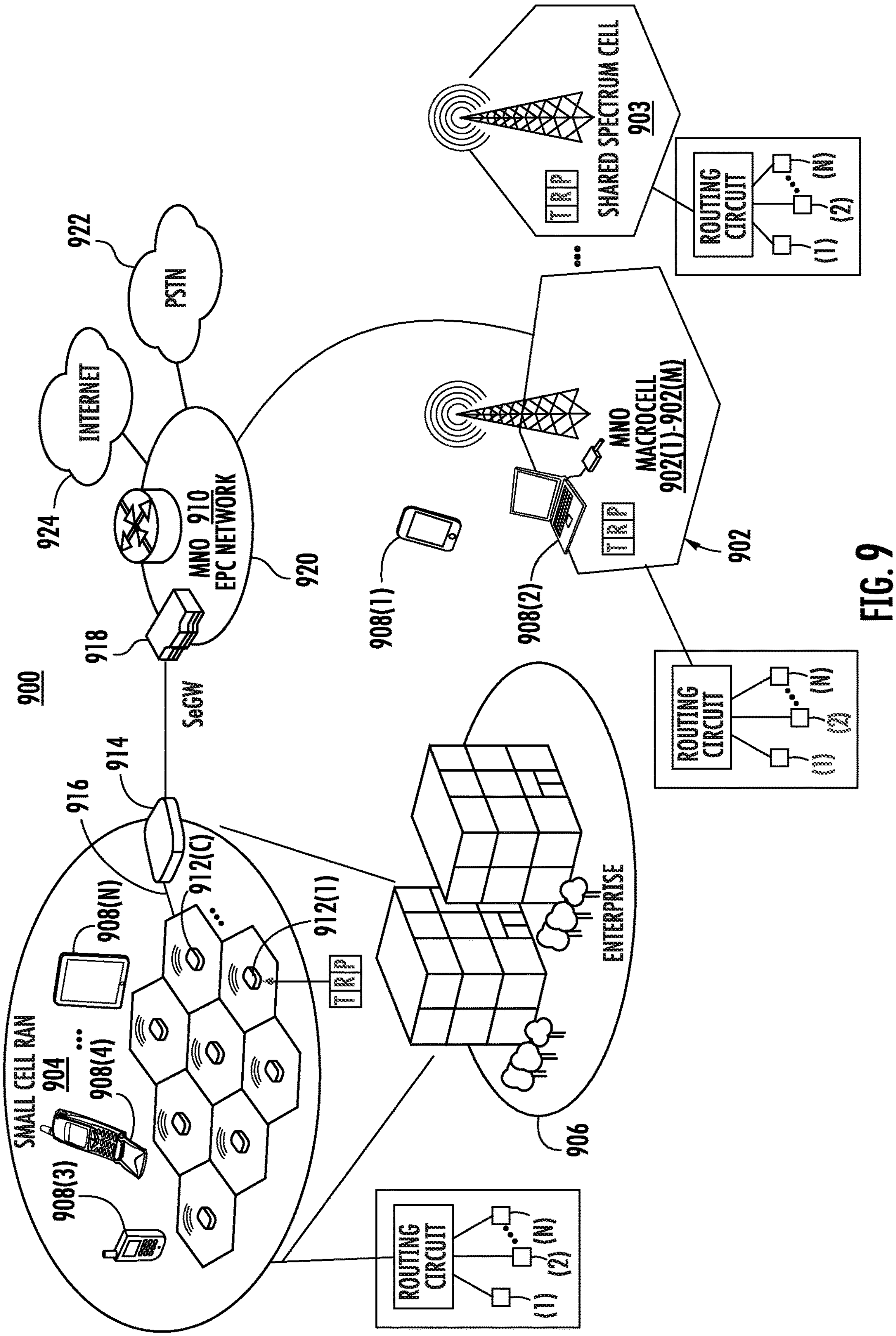
FIG. 9 is a schematic diagram of an exemplary mobile telecommunications environment that can include the radio access network in FIG. 3 to optimize beamforming coverage.

FIG. 9 is a schematic diagram of an exemplary mobile telecommunications RAN system 900 (also referred to as "RAN system 900") that can include, but is not limited to the radio access network 301 in FIGS. 3, 4A, and 4B, wherein the RAN system 900 includes multiple RANs implemented according to a RAN standard (e.g., O-RAN standard) and each configured to transparently interface with shared RUs through an intermediary neutral host agent device.

In this regard, RAN system 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. The macrocell 902 can be or include a wireless device(s) that can be configured to selectively control whether received transmit channels are transmitted through an antenna array of the wireless device. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. The macrocell 902 can be or include a wireless device(s) that can be configured to selectively control whether received transmit channels are transmitted through an antenna array of the wireless device. The macrocell 902 can be a wireless device that can be configured to selectively control whether received transmit channels are transmitted through an antenna array of the wireless device. For example, the shared spectrum cell 903 may be operated by a third party that is not an MNO and wherein the shared spectrum cell 903 supports CBRS. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO microcell(s) 902, the shared spectrum cell 903, and the small cell RAN 904 depending on the location of the user mobile communications devices 908(3)-908(N).

In FIG. 9, the RAN system 900 in this example is arranged as an LTE system as described by the Third Generation Partnership Project (3GPP) as an evolution of the GSM/UMTS standards (Global System for Mobile Communication/Universal Mobile Telecommunications System). It is emphasized, however, that the aspects described herein may also be applicable to other network types and protocols. The RAN system 900 includes the enterprise environment 906 in which the small cell RAN 904 is implemented. The small cell RAN 904 includes a plurality of small cell radio nodes 912(1)-912(C), which are wireless devices that can be configured to selectively control whether received transmit channels are transmitted through an antenna array of the wireless devices. Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The RAN system 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the RAN system 900. The neutral host agent device 915 could be provided between the macrocell 902 and the small cell RAN 904 to transparently manage communications between the macrocell 902 and the small cell RAN 904.

Figure 10:
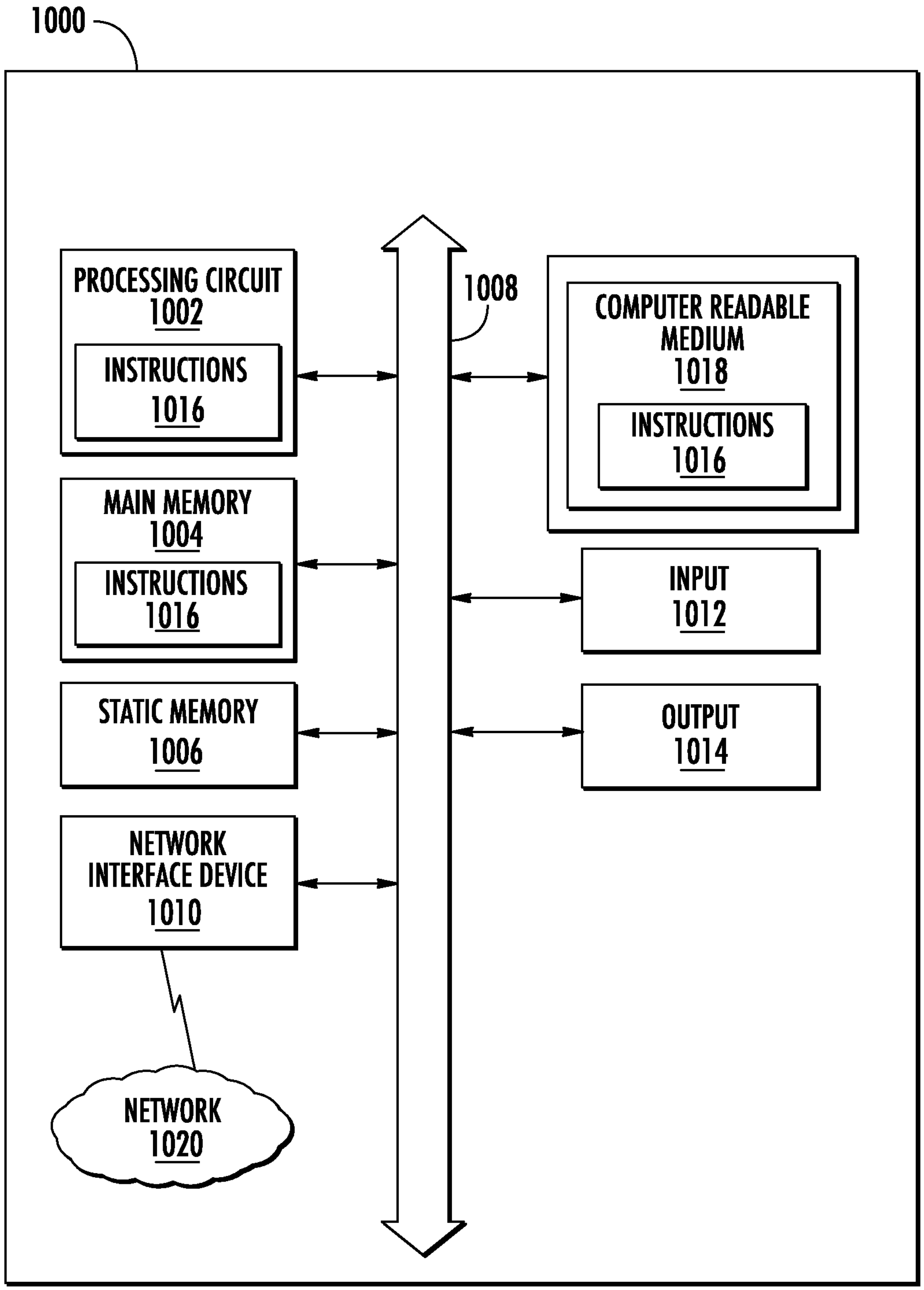
FIG. 10 is a schematic diagram of a representation of an exemplary computer system that can be included in or interfaced with any of the components in a WCS, including but not limited to the radio access network in FIG. 3, to optimize beamforming coverage.

Any of the circuits, components, devices, modules described herein, including but not limited to the radio node 304 in the radio access network 301 in FIGS. 3, 4A, and 4B, can include or be included in a computer system 1000, such as that shown in FIG. 10, to carry out their functions and operations as described herein. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random-access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. The term "computer-readable medium" and "machine-readable medium" shall also be taken to include any medium that is capable of storing, encoding or carrying a set of instructions for execution by the processing circuit and that cause the processing circuit to perform any one or more of the methodologies of the embodiments disclosed herein. For example, a computer-readable medium or a machine-readable medium includes a machine-readable storage medium (e.g., read only memory ("ROM"), random access memory ("RAM"), magnetic disk storage medium, optical storage medium, flash memory devices, etc.), solid-state memories, optical media, magnetic media, and the like. Notwithstanding this broad definition, specifically excluded from this definition are electromagnetic carrier waves or other signals that have information encoded thereon or therein but lack tangible form.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components and/or systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented as electronic hardware, instructions stored in memory or in another computer-readable medium and executed by a processor or other processing device, or combinations of both. The various illustrative logical blocks, modules, and circuits described in connection with the embodiments disclosed herein may be implemented with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, as examples. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A radio access network, comprising:
at least one radio node mounted at a first height relative to a ground and configured to radiate a plurality of radio frequency (RF) beams each steered toward a respective one of a plurality of primary beam directions intercepting the ground; and
a plurality of reflector devices each mounted at a second height lower than the first height relative to the ground and configured to intercept and redirect a respective one of the plurality of RF beams to a respective one of a plurality of secondary beam directions parallel to the ground, wherein at least one of the plurality of reflector devices is configured to shape its respective redirected RF beam to provide greater coverage across a horizontal plane parallel to the ground while reducing energy spread in a vertical plane perpendicular to the ground; and
wherein the at least one radio node is mounted on a ceiling of a coverage area; and each of the plurality of reflector devices is mounted on a wall in the coverage area.

2. The radio access network of claim 1, wherein each of the plurality of reflector devices is further configured to cause the respective one of the plurality of RF beams to be redirected with a broader beamwidth on a horizontal plane parallel to the ground and a narrower beamwidth on a vertical plane perpendicular to the ground.

3. The radio access network of claim 1, wherein each of the plurality of reflector devices is mounted at the second height that is one-half meter above an average height of a user equipment (UE).

4. The radio access network of claim 1, wherein each of the plurality of reflector devices is configured, either statically or dynamically, to steer its respective redirected RF beam in desired beam directions and with desired beamwidths, wherein the dynamic steering is achieved through electromechanical actuators controlled by a wireless access point, and the static steering is achieved through pre-calibrated fixed orientations set during installation.

5. The radio access network of claim 1, wherein the at least one radio node is collocated with the plurality of reflector devices.

6. The radio access network of claim 1, wherein the plurality of reflector devices comprises a plurality of passive reflectors.

7. The radio access network of claim 1, wherein the plurality of reflector devices comprises a plurality of active reflectors.

8. The radio access network of claim 1, wherein the plurality of reflector devices comprises a combination of passive reflectors and active reflectors.

9. A method for optimizing beamforming coverage in a radio access network in a wireless communications system (WCS) comprising:
radiating a plurality of radio frequency (RF) beams from at least one radio node, each steered toward a respective one of a plurality of primary beam directions intercepting a ground; and
intercepting and redirecting, from a respective one of a plurality of reflector devices, the plurality of RF beams to a plurality of secondary beam directions parallel to the ground, and
shaping the redirected RF beams to provide greater coverage across a horizontal plane parallel to the ground while reducing energy spread in a vertical plane perpendicular to the ground; and
mounting the at least one radio node on a ceiling of a coverage area; and
mounting each of the plurality of reflector devices on a wall in the coverage area.

10. The method of claim 9, further comprising redirecting each of the plurality of RF beams with a broader beamwidth on a horizontal plane parallel to the ground and a narrower beamwidth on a vertical plane perpendicular to the ground.

11. The method of claim 9, further comprising: radiating the plurality of RF beams from at least one radio node; and intercepting and redirecting each of the plurality of RF beams from a respective one of a plurality of reflector devices.

12. The method of claim 11, further comprising mounting each of the plurality of reflector devices one-half meter above an average height of a user equipment (UE).

13. The method of claim 11, further comprising: statically or dynamically configuring the plurality of reflector devices to steer the redirected RF beams in desired beam directions and with desired beamwidths, wherein the dynamic configuration includes using electromechanical actuators to adjust the orientation of the reflectors based on control signals, and the static configuration includes pre-calibrated fixed orientations, and wherein the dynamic configuration further includes a feedback loop mechanism to continuously monitor and adjust the orientation of the reflectors based on real-time signal quality metrics.

14. The method of claim 9, further comprising: mounting the at least one radio node at a first height relative to the ground; and mounting each of the plurality of reflector devices at a second height lower than the first height relative to the ground.

15. The method of claim 14, further comprising collocating the at least one radio node with the plurality of reflector devices.

16. A wireless communications system (WCS) comprising a radio access network coupled to a service node, the radio access network comprising:
at least one radio node mounted at a first height relative to a ground and configured to radiate a plurality of radio frequency (RF) beams each steered toward a respective one of a plurality of primary beam directions intercepting the ground; and
a plurality of reflector devices each mounted at a second height lower than the first height relative to the ground and configured to intercept and redirect a respective one of the plurality of RF beams to a respective one of a plurality of secondary beam directions parallel to the ground, wherein at least one of the plurality of reflector devices is configured to shape its respective redirected RF beam to provide greater coverage across a horizontal plane parallel to the ground while reducing energy spread in a vertical plane perpendicular to the ground; and
wherein the at least one radio node is mounted on a ceiling of a coverage area; and each of the plurality of reflector devices is mounted on a wall in the coverage area.

17. The WCS of claim 16, further comprising an open radio access network (O-RAN) subsystem and a distributed communications system (DCS) each coupled to the service node.

18. The WCS of claim 16, wherein each of the plurality of reflector devices is further configured to cause the respective one of the plurality of RF beams to be redirected with a broader beamwidth on a horizontal plane parallel to the ground and a narrower beamwidth on a vertical plane perpendicular to the ground.

19. The WCS of claim 16, wherein each of the plurality of reflector devices is mounted at the second height that is one-half meter above an average height of a user equipment (UE).

20. The WCS of claim 16, wherein: each of the plurality of reflector devices is configured, either statically or dynamically, to steer its respective redirected RF beam in desired beam directions and with desired beamwidths, wherein the dynamic steering is achieved through electromechanical actuators controlled by a wireless access point, and the static steering is achieved through pre-calibrated fixed orientations set during installation.

* * * * *